US009106893B2

(12) United States Patent
Ji

(10) Patent No.: US 9,106,893 B2
(45) Date of Patent: Aug. 11, 2015

(54) 3D IMAGE PROCESSING APPARATUS OF MOBILE TERMINAL USING CONNECTION STATUS AND GLASSES TYPE SELECTION ICONS AND METHOD THEREOF

(75) Inventor: Salkmann Ji, Seoul (KR)

(73) Assignee: LG Electronics Inc., Seoul (KR)

( * ) Notice: Subject to any disclaimer, the term of this patent is extended or adjusted under 35 U.S.C. 154(b) by 506 days.

(21) Appl. No.: 13/191,714

(22) Filed: Jul. 27, 2011

(65) Prior Publication Data

US 2012/0147136 A1 Jun. 14, 2012

(30) Foreign Application Priority Data

Dec. 14, 2010 (KR) .................. 10-2010-0127884

(51) Int. Cl.
*H04N 13/04* (2006.01)
*H04N 13/00* (2006.01)

(52) U.S. Cl.
CPC ....... *H04N 13/0029* (2013.01); *H04N 13/0059* (2013.01); *H04N 2013/0096* (2013.01)

(58) Field of Classification Search
CPC .............. H04N 13/04; H04N 13/0029; H04N 2013/0096; H04N 13/0059
USPC ......... 348/43, 42; 382/154; 705/26; 715/779; 386/46; 370/466; 345/419; 709/227, 709/204

See application file for complete search history.

(56) References Cited

U.S. PATENT DOCUMENTS

| 6,216,173 | B1 * | 4/2001 | Jones et al. ................ 715/705 |
| 6,980,641 | B1 * | 12/2005 | Stanford et al. ............ 379/354 |
| 7,353,252 | B1 * | 4/2008 | Yang et al. .................. 709/204 |
| 7,489,863 | B2 | 2/2009 | Lee |
| 7,739,712 | B2 * | 6/2010 | Boyden et al. ................ 725/81 |
| 8,077,964 | B2 | 12/2011 | Berestov et al. |
| 2002/0062379 | A1 * | 5/2002 | Widegren et al. ............ 709/227 |
| 2003/0038047 | A1 * | 2/2003 | Sleva et al. .................. 206/370 |
| 2004/0037314 | A1 * | 2/2004 | Spear ......................... 370/466 |
| 2004/0243714 | A1 | 12/2004 | Wynn et al. |
| 2005/0177653 | A1 * | 8/2005 | Chiu .......................... 710/15 |
| 2006/0126713 | A1 * | 6/2006 | Chou et al. .................. 375/225 |
| 2006/0242564 | A1 * | 10/2006 | Egger et al. ................. 715/513 |
| 2007/0060363 | A1 * | 3/2007 | Nguyen et al. .............. 463/42 |
| 2007/0260526 | A1 * | 11/2007 | Bartel ........................ 705/26 |
| 2007/0291667 | A1 * | 12/2007 | Huber et al. ................. 370/260 |
| 2007/0296809 | A1 * | 12/2007 | Newbery ..................... 348/42 |
| 2008/0084896 | A1 * | 4/2008 | Fleury et al. ................ 370/468 |
| 2008/0232680 | A1 * | 9/2008 | Berestov et al. ............ 382/154 |
| 2009/0041419 | A1 * | 2/2009 | Kurita ......................... 386/46 |

(Continued)

FOREIGN PATENT DOCUMENTS

| CN | 101636747 A | 1/2010 |
| JP | 2008-109341 A | 5/2008 |

(Continued)

*Primary Examiner* — Richard Torrente
*Assistant Examiner* — Joseph Suh
(74) *Attorney, Agent, or Firm* — Birch, Stewart, Kolasch & Birch, LLP

(57) ABSTRACT

An image processing apparatus of a mobile terminal generates a three-dimensional (3D) image based on images captured by a camera, and transmit and/or display the generated 3D image to allow a user to easily, conveniently view the 3D image, and a method thereof are provided. The image processing apparatus of a mobile terminal receives images captured by at least a pair of cameras installed in the mobile terminal, converts the received images into a 3D image, and transmit the 3D image.

22 Claims, 11 Drawing Sheets

(56) References Cited

U.S. PATENT DOCUMENTS

| | | | |
|---|---|---|---|
| 2010/0191552 A1* | 7/2010 | Behrens et al. | 705/5 |
| 2010/0225645 A1* | 9/2010 | Suh et al. | 345/419 |
| 2011/0018983 A1* | 1/2011 | Kim et al. | 348/56 |
| 2011/0106657 A1* | 5/2011 | Yu et al. | 705/26.9 |
| 2011/0109715 A1* | 5/2011 | Jing et al. | 348/14.08 |
| 2011/0157309 A1* | 6/2011 | Bennett et al. | 348/43 |
| 2011/0179376 A1* | 7/2011 | Berestov et al. | 715/779 |
| 2011/0197151 A1* | 8/2011 | Abdo et al. | 715/764 |
| 2011/0211051 A1* | 9/2011 | Park et al. | 348/53 |

FOREIGN PATENT DOCUMENTS

| | | |
|---|---|---|
| JP | 2008-306768 A | 12/2008 |
| KR | 10-2006-0010089 A | 2/2006 |
| KR | 10-0735447 B1 | 6/2007 |

\* cited by examiner

FIG. 3
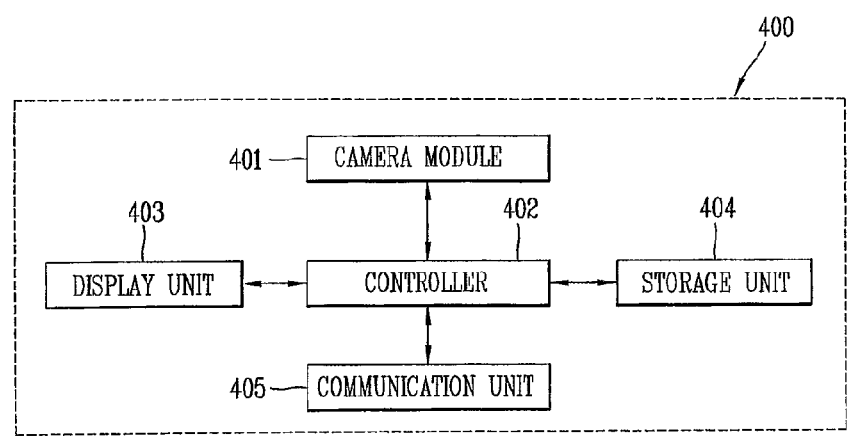
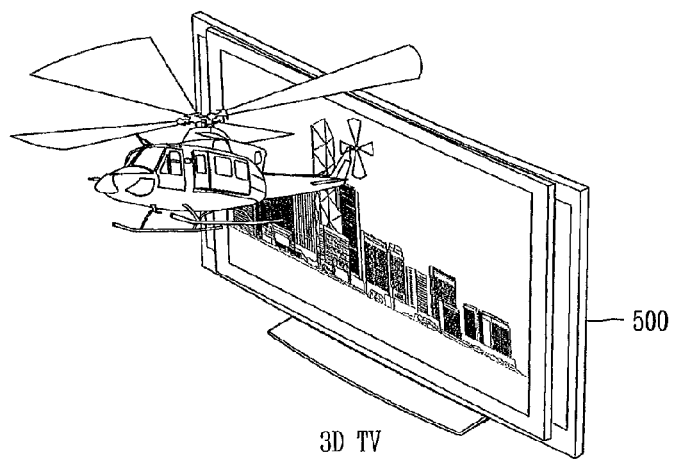
3D TV

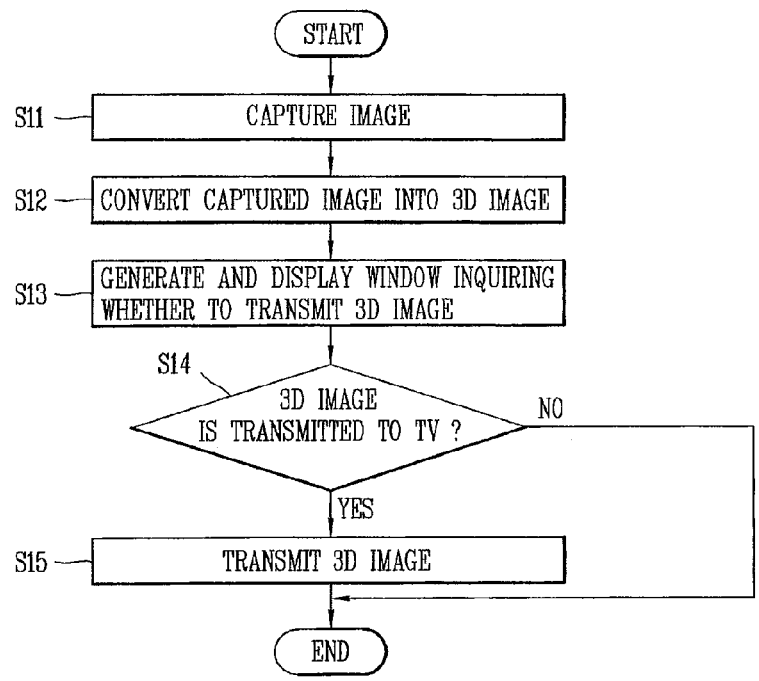
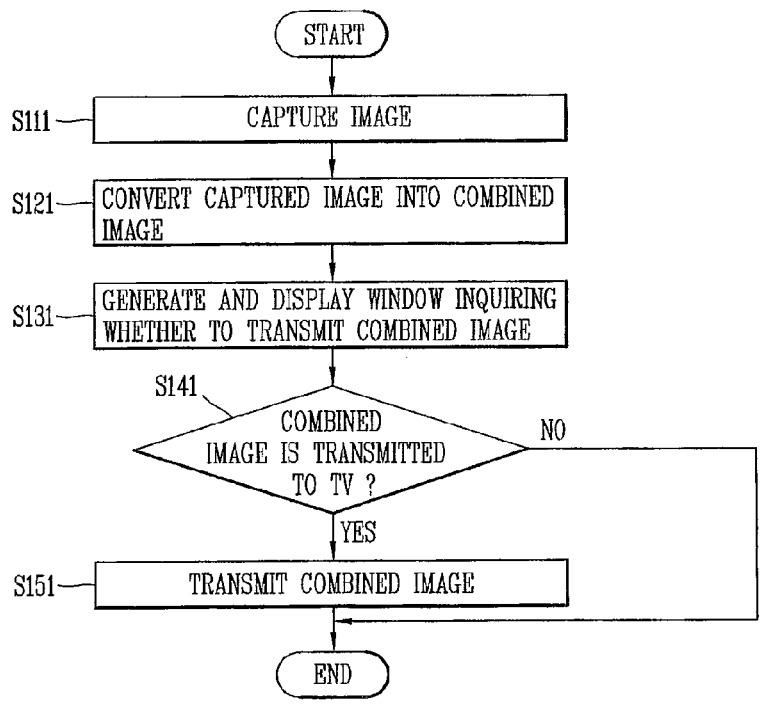

3D IMAGE PROCESSING APPARATUS OF MOBILE TERMINAL USING CONNECTION STATUS AND GLASSES TYPE SELECTION ICONS AND METHOD THEREOF

CROSS REFERENCE TO RELATED APPLICATIONS

The present application is related to, and claims priority to, Korean Patent Application 10-2010-0127884, filed on Dec. 14, 2010, the entire contents of which being incorporated herein by reference.

BACKGROUND OF THE INVENTION

1. Field of the Invention

The present invention relates to an image processing apparatus of a mobile terminal and a method thereof.

2. Description of the Related Art

In general, the related art image processing apparatus of a mobile terminal displays an image captured by a camera on a display unit.

SUMMARY OF THE INVENTION

According to an aspect of the present invention, there is provided an image processing apparatus of a mobile terminal, including: a camera module configured to receive images captured by at least a pair of cameras installed in a mobile terminal; a controller configured to convert the images received by the camera module into three-dimensional (3D) images; and a communication unit configured to transmit the 3D image through a communication interface.

The communication interface may be a high definition multimedia interface (HDMI).

The controller may convert the 3D image into an image of one of a side-by-side format and a frame sequential format.

The controller may convert the captured images into images of an anaglyph format to output the converted images in the anaglyph format.

The controller may generate a window inquiring whether to transmit the 3D image when the images received by the camera module are converted into the 3D image, and display the generated window on the display unit.

The communication unit may transmit the 3D image to a television through the HDMI or may transmit the 3D image to a server through a wired/wireless communication network.

The controller may generate a window inquiring about whether to transmit the 3D image to the server when the images captured by the camera module are converted into the 3D image, and display the generated window on the display unit.

The controller may generate a 3D image format setup menu for setting a 3D image format and display the generated 3D image format setup menu on the display unit.

When an icon denoting particular 3D glasses displayed on the 3D image format setup menu is selected, the controller may convert the images received by the camera module into images of a 3D image format corresponding to the selected particular 3D glasses.

When an icon denoting polarized glasses displayed on the 3D image format setup menu or an icon denoting active shutter glasses is selected, the controller may convert the images received by the camera module into images of one of a side-by-side format and a frame sequential format to generate a 3D image, and display the generated 3D image on the display unit.

When an icon denoting anaglyph glasses displayed on the 3D image format setup menu is selected, the controller may convert the images received by the camera module into images of an anaglyph format to generate a 3D image, and display the generated 3D image on the display unit.

The anaglyph format may be a red/blue anaglyph format or a gray anaglyph format.

When an icon denoting naked eyes displayed on the 3D image format setup menu is selected, the controller may convert the images received by the camera module into images of a 2D image format to generate 2D images, and display the 2D images on the display unit.

The 3D image format setup menu may include: one or more of a polarized glasses selection item including an icon denoting whether or not the polarized glasses have been selected, an icon denoting the polarized glasses, and character information indicating the name of the polarized glasses; an active shutter glasses selection item including an icon denoting whether or not active shutter glasses have been selected, an icon denote the active shutter glasses, and character information indicating the name of the active shutter glasses; an anaglyph glasses selection item including an icon denoting whether not anaglyph glasses have been selected, an icon denoting the anaglyph glasses, and character information indicating the name of the anaglyph glasses; and a naked eye selection item including an icon denoting whether or not naked eyes have been selected, an icon denoting naked eyes, and character information indicating the naked eyes.

According to another aspect of the present invention, there is provided an image processing method of a mobile terminal, including: receiving images captured by at least a pair of cameras installed in a mobile terminal; converting the received images into a 3D image; and transmitting the 3D image through a communication interface.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a schematic block diagram of the image processing apparatus of a mobile terminal according to a first exemplary embodiment of the present invention;

FIGS. 4A and 4B are flow charts illustrating the process of an image processing method of a mobile terminal according to the first exemplary embodiment of the present invention;

DETAILED DESCRIPTION OF THE INVENTION

An image processing apparatus and method capable of generating a 3D image based on images captured by a camera of a mobile terminal, and transmitting and/or displaying the generated 3D image to allow a user to easily, conveniently view the 3D image according to exemplary embodiments of the present invention will now be described with reference to FIGS. 1 to 11.

Figure 1:
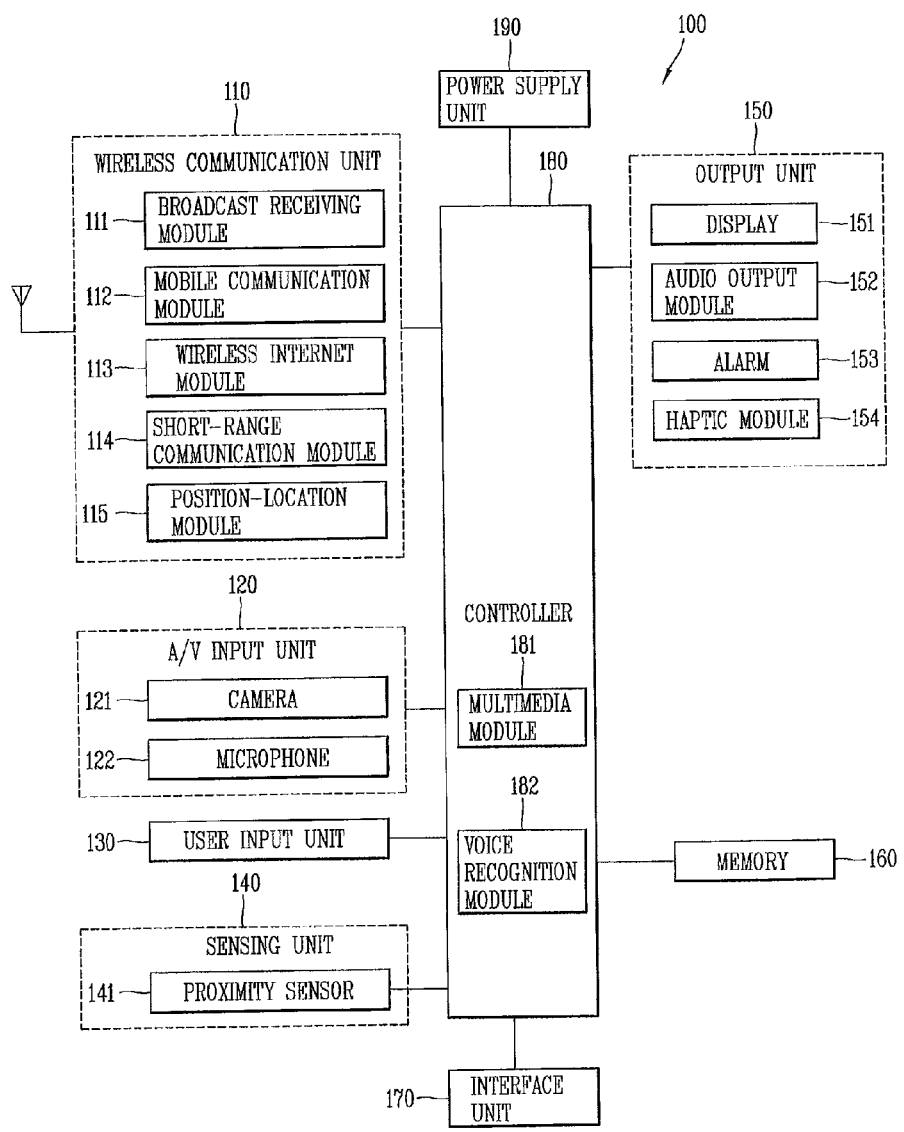
FIG. 1 is a schematic block diagram of a mobile terminal employing an image processing apparatus according to an exemplary embodiment of the present invention.

FIG. 1 is a schematic block diagram showing the configuration of a mobile communication terminal employing an image display apparatus according to an exemplary embodiment of the present invention. The mobile communication terminal 100 may be implemented in various forms such as mobile phones, smart phones, notebook computers, digital broadcast terminals, PDAs (Personal Digital Assistants), PMPs (Portable Multimedia Player), etc.

As shown in FIG. 1, the mobile communication terminal 100 includes a wireless communication unit 110, an A/V (Audio/Video) input unit 120, a user input unit 130, a sensing unit 140, an output unit 150, a memory 160, an interface unit 170, a controller 180, and a power supply unit 190, etc. FIG. 1 shows the mobile communication terminal 100 having various components, but it is understood that implementing all of the illustrated components is not a requirement. The mobile communication terminal 100 may be implemented by greater or fewer components.

The wireless communication unit 110 typically includes one or more components allowing radio communication between the mobile communication terminal 100 and a wireless communication system or a network in which the mobile communication terminal is located. For example, the wireless communication unit may include at least one of a broadcast receiving module 111, a mobile communication module 112, a wireless Internet module 113, a short-range communication module 114, and a position-location module 115.

The broadcast receiving module 111 receives broadcast signals and/or broadcast associated information from an external broadcast management server (or other network entity) via a broadcast channel. The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast associated information may refer to information associated with a broadcast channel, a broadcast program or a broadcast service provider. The broadcast signal may include a TV broadcast signal, a radio broadcast signal, a data broadcast signal, and the like. Also, the broadcast signal may further include a broadcast signal combined with a TV or radio broadcast signal.

The broadcast associated information may also be provided via a mobile communication network and, in this case, the broadcast associated information may be received by the mobile communication module 112. The broadcast signal may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may be configured to receive signals broadcast by using various types of broadcast systems. In particular, the broadcast receiving module 111 may receive a digital broadcast by using a digital broadcast system such as multimedia broadcasting-terrestrial (DMB-T), digital multimedia broadcasting-satellite (DMB-S), digital video broadcast-handheld (DVB-H), the data broadcasting system known as media forward link only (MediaFLO®), integrated services digital broadcast-terrestrial (ISDB-T), etc. The broadcast receiving module 111 may be configured to be suitable for every broadcast system that provides a broadcast signal as well as the above-mentioned digital broadcast systems. Broadcast signals and/or broadcast-associated information received via the broadcast receiving module 111 may be stored in the memory 160 (or anther type of storage medium).

The mobile communication module 112 transmits and/or receives radio signals to and/or from at least one of a base station (e.g., access point, Node B, etc.), an external terminal (e.g., other user devices) and a server (or other network entities). Such radio signals may include a voice call signal, a video call signal or various types of data according to text and/or multimedia message transmission and/or reception.

The wireless Internet module 113 supports wireless Internet access or other wireless network access for the mobile communication terminal. This module may be internally or externally coupled to the terminal. Here, as the wireless Internet technique, a wireless local area network (WLAN), Wi-Fi, wireless broadband (WiBro), world interoperability for microwave access (WiMAX), high speed downlink packet access (HSDPA), and the like, may be used.

The short-range communication module 114 is a module for supporting short range communications. Some examples of short-range communication technology include Bluetooth™, Radio Frequency IDentification (RFID), Infrared Data Association (IrDA), Ultra-WideBand (UWB), ZigBee™, and the like.

The position-location module 115 is a module for checking or acquiring a location (or position) of the mobile communication terminal (when the mobile communication terminal is located in a vehicle, the location of the vehicle can be checked). For example, the position-location module 115 may be embodied by using a GPS (Global Positioning System) module that receives location information from a plurality of satellites. Here, the location information may include coordinate information represented by latitude and longitude values. For example, the GPS module may measure an accurate time and distance from three or more satellites, and accurately calculate a current location of the mobile communication terminal according to trigonometry based on the measured time and distances. A method of acquiring distance and time information from three satellites and performing error correction with a single satellite may be used. In particular, the GPS module may acquire an accurate time together with three-dimensional speed information as well as the location of the latitude, longitude and altitude values from the location information received from the satellites. As the position-location module 115, a Wi-Fi position system and/or a hybrid positioning system may be used.

The position-location module 115 may further include a geomagnetic sensor and/or a gravity sensor for detecting a direction. For example, the position-location module 115 detects the direction (e.g., four cardinal points) of the mobile terminal in order to implement a navigation using an augmented reality through the geomagnetic sensor (or an electronic compass). The position-location module 115 detects in which direction the gravitation works through the gravity sensor (G sensor). When the user holds the mobile terminal such that the mobile terminal is long in a vertical direction, the position-location module 115 displays a vertically long screen image, and when the use holds the mobile terminal such that the mobile terminal is long in a horizontal direction, the position-location module 115 automatically rotates the screen by 90 degrees to show a wide screen. Also, when the user views a video, the position-location module 115 rotates the screen according to the direction in which the user holds the mobile terminal to allow the user to conveniently view an image.

The A/V input unit 120 is configured to receive an audio or video signal. The A/V input unit 120 may include a camera 121 (or other image capture device) and a microphone 122 (or other sound pick-up device). The camera 121 processes image data of still pictures or video obtained by an image capturing device in a video capturing mode or an image capturing mode. The processed image frames may be displayed on a display 151 (or other visual output device).

The image frames processed by the camera 121 may be stored in the memory 160 (or other storage medium) or transmitted via the wireless communication unit 110. Two or more cameras 121 may be provided according to the configuration of the mobile communication terminal.

The microphone 122 may receive sounds (audible data) via a microphone (or the like) in a phone call mode, a recording mode, a voice recognition mode, and the like, and can process such sounds into audio data. The processed audio (voice) data may be converted for output into a format transmittable to a mobile communication base station (or other network entity) via the mobile communication module 112 in case of the phone call mode. The microphone 122 may implement various types of noise canceling (or suppression) algorithms to cancel (or suppress) noise or interference generated in the course of receiving and transmitting audio signals.

The user input unit 130 (or other user input device) may generate key input data from commands entered by a user to control various operations of the mobile communication terminal. The user input unit 130 allows the user to enter various types of information, and may include a keypad, a dome switch, a touch pad (e.g., a touch sensitive member that detects changes in resistance, pressure, capacitance, etc. due to being contacted) a jog wheel, a jog switch, and the like. In particular, when the touch pad is overlaid on the display 151 in a layered manner, it may form a touch screen.

The sensing unit 140 (or other detection means) detects a current status (or state) of the mobile communication terminal 100 such as an opened or closed state of the mobile communication terminal 100, a location of the mobile communication terminal 100, the presence or absence of user contact with the mobile communication terminal 100 (i.e., touch inputs), the orientation of the mobile communication terminal 100, an acceleration or deceleration movement and direction of the mobile communication terminal 100, etc., and generates commands or signals for controlling the operation of the mobile communication terminal 100. For example, when the mobile communication terminal 100 is implemented as a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device.

The interface unit 170 (or other connection means) serves as an interface by which at least one external device may be connected with the mobile communication terminal 100. For example, the external devices may include wired or wireless headset ports, an external power supply (or battery charger) ports, wired or wireless data ports, memory card ports, ports for connecting a device having an identification module, audio input/output (I/O) ports, video I/O ports, earphone ports, or the like. Here, the identification module may be a memory chip (or other element with memory or storage capabilities) that stores various information for authenticating user's authority for using the mobile communication terminal 100 and may include a user identity module (UIM), a subscriber identity module (SIM) a universal subscriber identity module (USIM), and the like. In addition, the device having the identification module (referred to as the 'identifying device', hereinafter) may take the form of a smart card. Accordingly, the identifying device may be connected with the terminal 100 via a port or other connection means. The interface unit 170 may be used to receive inputs (e.g., data, information, power, etc.) from an external device and transfer the received inputs to one or more elements within the mobile communication terminal 100 or may be used to transfer data within the mobile communication terminal to an external device.

The output unit 150 is configured to provide outputs in a visual, audible, and/or tactile manner (e.g., audio signal, video signal, alarm signal, vibration signal, etc.). The output unit 150 may include the display 151, an audio output module 152, an alarm unit 153, and the like.

The display 151 may display information processed in the mobile terminal 100. For example, when the mobile terminal 100 is in a phone call mode, the display 151 may display a User Interface (UI) or a Graphic User Interface (GUI) associated with a call or other communication (such as text messaging, multimedia file downloading, etc.). When the mobile terminal 100 is in a video call mode or image capturing mode, the display 151 may display a captured image and/or received image, a UI or GUI that shows videos or images and functions related thereto, and the like.

The display 151 may include at least one of a Liquid Crystal Display (LCD), a Thin Film Transistor-LCD (TFT-LCD), an Organic Light Emitting Diode (OLED) display, a flexible display, a three-dimensional (3D) display, or the like. The mobile terminal 100 may include two or more display units (or other display means) according to its particular desired embodiment. For example, the mobile terminal may include both an external display unit and an internal display unit.

When the display 151 and the touch pad are overlaid in a layered manner to form a touch screen, the display 151 may function as both an input device and an output device. The touch sensor may have the form of, for example, a touch film, a touch sheet, a touch pad, and the like.

The touch sensor may be configured to convert the pressure applied to a particular portion of the display 151 or a change in capacitance generated at a particular portion of the display 151 into an electrical input signal. The touch sensor may be configured to detect a touch input pressure as well as a touch input position and a touch input area. When there is a touch input with respect to the touch sensor, the corresponding signal(s) are sent to a touch controller. The touch controller processes the signal(s) and transmits corresponding data to the controller 180. Accordingly, the controller 180 can recognize a touched region of the display 151.

Proximity touch in the present exemplary embodiment refers to recognition of the pointer positioned to be close to the touch screen without being in contact with the touch screen.

A proximity sensor 141 may be may be disposed within the mobile terminal covered by the touch screen or near the touch screen. The proximity sensor 141 refers to a sensor for detecting the presence or absence of an object that accesses a certain detect surface or an object that exists nearby by using the force of electromagnetism or infrared rays without a mechanical contact. Thus, the proximity sensor 141 has a longer life span compared with a contact type sensor, and it can be utilized for various purposes.

The example of the proximity sensor 141 may be a transmission type photo sensor, a direct reflection type photo sensor, a mirror-reflection type photo sensor, an RF oscillation type proximity sensor, a capacitance type proximity sensor, a magnetic proximity sensor, an infrared proximity sensor. When the touch screen is an electrostatic type touch screen, an approach of the pointer is detected based on a change in an electric field according to the approach of the pointer. In this case, the touch screen (touch sensor) may be classified as a proximity sensor.

In the following description, for the sake of brevity, recognition of the pointer positioned to be close to the touch screen without being contacted will be called a 'proximity touch', while recognition of actual contacting of the pointer on the touch screen will be called a 'contact touch'. In this case, when the pointer is in the state of the proximity touch, it means that the pointer is positioned to correspond vertically to the touch screen.

The proximity sensor 141 detects a proximity touch and a proximity touch pattern (e.g., a proximity touch distance, a proximity touch speed, a proximity touch time, a proximity touch position, a proximity touch movement state, or the like), and information corresponding to the detected proximity touch operation and the proximity touch pattern can be outputted to the touch screen.

The sensing unit 140 may include an acceleration sensor. The acceleration sensor, an element for converting a change in acceleration in one direction into an electrical signal, is widely used in line with the development of a micro-electro-mechanical system (MEMS) technique. The acceleration sensor includes various types of sensors: an acceleration sensor installed in an air-bag system of a vehicle to measure a great value of acceleration used for detecting a collision, an acceleration sensor for recognizing a fine operation of a user's hand so as to be used as an input unit for games, or the like. The acceleration sensor is configured such that two axes or three axes are mounted on a single package, and only a Z-axis may be required according to a usage environment. Thus, when an X-axis directional acceleration sensor or a Y-axis directional acceleration sensor is to be used for a certain reason, a separate piece substrate may be used and the acceleration sensor may be mounted on a main substrate.

The audio output module 152 may output audio data received from the wireless communication unit 110 or stored in the memory 160 in a call signal reception mode, a call mode, a record mode, a voice recognition mode, a broadcast reception mode, and the like. Also, the audio output module 152 may provide audible outputs related to a particular function (e.g., a call signal reception sound, a message reception sound, etc.) performed in the mobile terminal 100. The audio output module 152 may include a receiver, a speaker, a buzzer, etc.

The alarm 153 outputs a signal for informing about an occurrence of an event of the mobile terminal 100. Events generated in the mobile terminal may include call signal reception, message reception, key signal inputs, and the like. In addition to video or audio signals, the alarm 153 may output signals in a different manner, for example, to inform about an occurrence of an event. For example, the alarm 153 may output a signal in the form of vibration. When a call signal is received or a message is received, the alarm 153 may vibrate the mobile terminal through a vibration means. Or, when a key signal is inputted, the alarm 153 may vibrate the mobile terminal 100 through a vibration means as a feedback with respect to the key signal input. Through the vibration, the user may recognize the occurrence of an event. A signal for notifying about the occurrence of an event may be output to the display 151 or to the audio output module 152.

A haptic module 154 generates various tactile effects the user may feel. A typical example of the tactile effects generated by the haptic module 154 is vibration. The strength and pattern of the haptic module 154 can be controlled. For example, different vibrations may be combined to be outputted or sequentially outputted.

Besides vibration, the haptic module 154 may generate various other tactile effects such as an effect by stimulation such as a pin arrangement vertically moving with respect to a contact skin, a spray force or suction force of air through a jet orifice or a suction opening, a contact on the skin, a contact of an electrode, electrostatic force, etc., an effect by reproducing the sense of cold and warmth using an element that can absorb or generate heat.

The haptic module 154 may be implemented to allow the user to feel a tactile effect through a muscle sensation such as fingers or arm of the user, as well as transferring the tactile effect through a direct contact. Two or more haptic modules 154 may be provided according to the configuration of the mobile terminal 100. The haptic module 154 may be provided to a place which is frequently in contact with the user. For example, the haptic module 154 may be provided to a steering wheel, a gearshift, a lever, a seat, and the like.

The memory 160 may store software programs used for the processing and controlling operations performed by the controller 180, or may temporarily store data (e.g., a map data, phonebook, messages, still images, video, etc.) that are inputted or outputted.

The memory 160 may include at least one type of storage medium including a Flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 160 over the Internet.

The interface unit 170 serves as an interface with every external device connected with the mobile terminal 100. For example, the external devices may transmit data to an external device, receives and transmits power to each element of the mobile terminal 100, or transmits internal data of the mobile terminal 100 to an external device. For example, the interface unit 170 may include wired or wireless headset ports, external power supply ports, wired or wireless data ports, memory card ports, ports for connecting a device having an identification module, audio input/output (I/O) ports, video I/O ports, earphone ports, or the like. Here, the identification module may be a chip that stores various information for authenticating the authority of using the mobile terminal 100 and may include a user identity module (UIM), a subscriber identity module (SIM) a universal subscriber identity module (USIM), and the like. In addition, the device having the identification module (referred to as 'identifying device', hereinafter) may take the form of a smart card. Accordingly, the identifying device may be connected with the mobile terminal 100 via a port. The interface unit 170 may be used to receive inputs (e.g., data, information, power, etc.) from an external device and transfer the received inputs to one or more elements within the mobile terminal 100 or may be used to transfer data between the mobile terminal and an external device.

When the mobile terminal 100 is connected with an external cradle, the interface unit 170 may serve as a passage to allow power from the cradle to be supplied therethrough to the mobile terminal 100 or may serve as a passage to allow various command signals inputted by the user from the cradle to be transferred to the mobile terminal therethrough. Various command signals or power inputted from the cradle may operate as signals for recognizing that the mobile terminal is properly mounted on the cradle.

The controller 180 typically controls the general operations of the mobile terminal. For example, the controller 180 performs controlling and processing associated with voice calls, data communications, video calls, and the like. The controller 180 may include a multimedia module 181 for reproducing multimedia data. The multimedia module 181 may be configured within the controller 180 or may not be separable from the controller 180.

The controller 180 may perform a pattern recognition processing to recognize a handwriting input or a picture drawing input performed on the touch screen as characters or images, respectively.

The power supply unit 190 receives external power or internal power and supplies appropriate power required for operating respective elements and components under the control of the controller 180.

Various embodiments described herein may be implemented in a computer-readable or its similar medium using, for example, software, hardware, or any combination thereof. For a hardware implementation, embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments may be implemented by the controller 180. For a software implementation, embodiments, such as procedures or functions described herein, may be implemented by separate software modules. Each software module may perform one or more functions or operations described herein. Software codes can be implemented by a software application written in any suitable programming language. The software codes may be stored in the memory 160 and executed by the controller 180.

The voice recognition module 182 recognizes a voice pronounced by the user and performs a corresponding function according to the recognized voice signal. The mobile terminal 100 can further include a navigation session for displaying a travel route on a map or otherwise outputting direction information.

Meanwhile, an image processing apparatus applied to the mobile terminal includes a camera module for receiving images captured by at least a pair of cameras; a controller for converting the images received by the camera module into a three-dimensional (3D) image; and a communication unit for outputting the 3D image to a 3D TV through a high definition multimedia interface (HDMI).

The communication unit may output the 3D image to the 3D TV through a short-range wireless communication network (e.g., Bluetooth™ communication, infrared communication, or the like). The controller may display the 3D image or a 2D image on the display unit. The controller may store the 3D image and/or the 2D image in the storage unit (memory) in real time.

The controller may convert the 3D image into an image of any one of a side-by-side format and a frame sequential format. The controller may convert the 3D image into an image of an anaglyph format, and output the 3D image in the anaglyph format to the 3D TV. The anaglyph format may be a red/blue anaglyph format or a gray anaglyph format.

The controller may include a coding unit for encoding the 3D image or the 2D image and outputting the encoded image.

The components (or elements) of the image processing apparatus applied to the mobile terminal 100 according to exemplary embodiments of the present invention will be described in detail with reference to FIGS. 3 to 11.

The configuration of the telematics terminal 200 employing the image processing apparatus according to an exemplary embodiment of the present invention will now be described with reference to FIG. 2.

Figure 2:
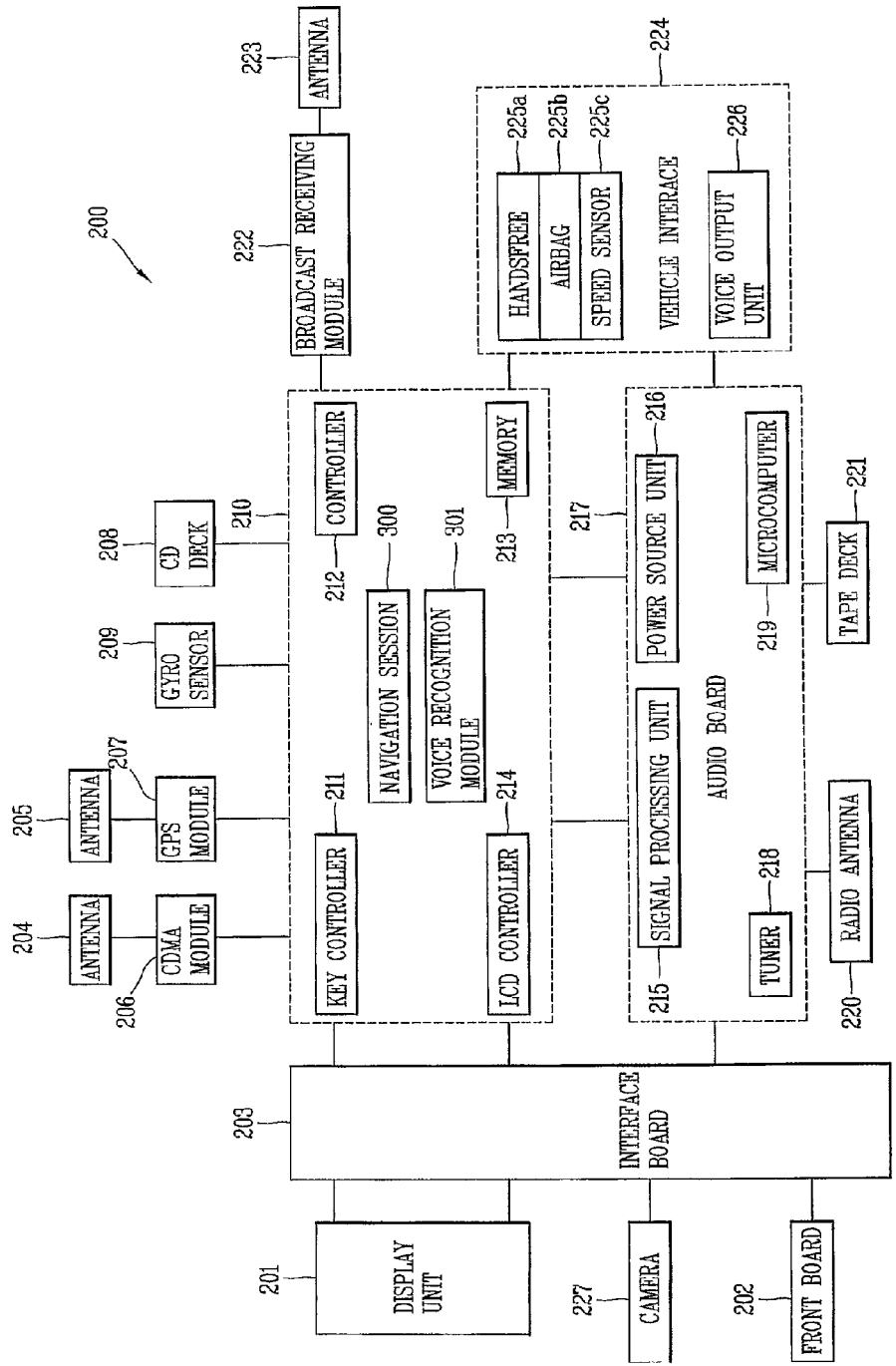
FIG. 2 is a schematic block diagram showing a telematics terminal employing the image processing apparatus according to an exemplary embodiment of the present invention.

FIG. 2 is a schematic block diagram showing a telematics terminal 200 employing the image processing apparatus according to an exemplary embodiment of the present invention.

As shown in FIG. 2, the telematics terminal 200 includes a main board 210 including a controller (e.g., a central processing unit (CPU)) 212 for controlling the telematics terminal 200 on the whole, a memory 213 for storing various types of information, a key controller 211 for controlling various key signals, and an LCD controller 214 for controlling an LCD.

The memory 213 stores map information (map data) for displaying road guidance information on a digital map. Also, the memory 213 stores a traffic information collecting control algorithm for inputting traffic information according to the situation of a road along which the vehicle currently travels (runs), and information for controlling the algorithm.

The main board 210 interfaces with a CDMA module 206, a mobile terminal having a unique device number as assigned and installed in the vehicle, a GPS module 207 for guiding a location of the vehicle, receiving a GPS signal for tracking a travel route from a start point to a destination, or transmitting traffic information collected by the user, as a GPS signal, a CD deck 208 for reproducing a signal recorded in a CD (Compact Disk), a gyro sensor 209, or the like. The CDMA module 206 and the GPS module 207 receive signals via antennas 204 and 205.

A broadcast receiving module 222 is connected with the main board 210 and receives a TV or other signal via a antenna 223. A display unit (i.e., an LCD) 201 under the control of the LCD controller 214, a front board 202 under the control of the key controller 211, and a camera 227 for capturing the interior and/or the exterior of a vehicle are connected to the main board 210 via an interface board 203. The display unit 201 displays various video signals and character signals, and the front board 202 includes buttons for various key signal inputs and provides a key signal corresponding to a button selected by the user to the main board 210. Also, the display unit 201 includes a proximity sensor and a touch sensor (touch screen) of FIG. 1.

The front board 202 includes a menu key for directly inputting traffic information. The menu key may be controllable by the key controller 211.

An audio board 217 is connected with the main board 210 and processes various audio signals. The audio board 217 includes a microcomputer 219 for controlling the audio board 217, a tuner 218 for receiving a radio signal, a power source unit 216 for supplying power to the microcomputer 219 and a signal processing unit 215 for processing various voice signals.

The audio board 217 may also include at least one of a radio antenna 220 for receiving a radio signal and a tape deck 221 for reproduce an audio tape. The audio board 217 may interface with a voice output unit (e.g., an amplifier) 226 for outputting a voice signal processed by the audio board 217.

The voice output unit (amplifier) 226 is connected to or included in a vehicle interface 224. Namely, the audio board 217 and the main board 210 are connected to the vehicle interface 224. A handsfree 225a for inputting a voice signal, an airbag 225b configured for the security of a passenger, a speed sensor 225c for detecting the speed of the vehicle, or the like, may be connected to the vehicle interface 224. The speed sensor 225c calculates a vehicle speed and provides the calculated vehicle speed information to the CPU 212.

The navigation session 300 applied to the telematics terminal 200 generates road guidance information based on the map data and current location information of the vehicle and provides the generated road guidance information to a user.

The display unit 201 detects a proximity touch within a display window via a proximity sensor. For example, when a pointer (e.g., user's finger or stylus) is proximity-touched, the display unit 201 detects the position of the proximity touch and outputs position information corresponding to the detected position to the controller 212.

A voice recognition device (or a voice recognition module) 301 recognizes a voice pronounced by the user and performs a corresponding function according to the recognized voice signal.

The navigation session 300 applied to the telematics terminal displays a current location and a travel route on map data.

Meanwhile, the image processing apparatus applied to the telematics terminal 200 according to an exemplary embodiment of the present invention may includes: a camera module for receiving images captured by at least a pair of cameras; a controller for converting the images received by the camera module into a three-dimensional (3D) image; and a communication unit for outputting the 3D image to a 3D TV through a high definition multimedia interface (HDMI).

The communication unit may output the 3D image to the 3D TV through a short-range wireless communication network (e.g., Bluetooth™ communication, infrared communication, or the like). The controller may display the 3D image or a 2D image on the display unit. The controller may store the 3D image and/or the 2D image in the storage unit (memory) in real time.

The controller may convert the 3D image into an image of any one of a side-by-side format and a frame sequential format. The controller may convert the 3D image into an image of an anaglyph format, and output the 3D image in the anaglyph format to the 3D TV. The anaglyph format may be a red/blue anaglyph format or a gray anaglyph format.

The controller may include a coding unit for encoding the 3D image or the 2D image and outputting the encoded image.

The components (or elements) of the image processing apparatus applied to the telematics terminal 200 according to exemplary embodiments of the present invention will be described in detail with reference to FIGS. 3 to 11.

Hereinafter, an image processing apparatus and method of the mobile terminal according to a first exemplary embodiment of the present invention will now be described with reference to FIGS. 3 to 5. The image processing apparatus and method according to exemplary embodiments of the present invention may be applicable to a video player such as a 3D TV for displaying a 3D and/or 2D image, or to a terminal such as a smartphone, a notebook computer, a personal digital assistant (PDA), a portable multimedia player (PMP), or the like, as well as to a mobile terminal such as the mobile terminal 100, the telematics terminal 200, a navigation device, or the like.

FIG. 3 is a schematic block diagram of the image processing apparatus of a mobile terminal according to a first exemplary embodiment of the present invention.

As shown in FIG. 3, an image processing apparatus 400 of a mobile terminal according to the first exemplary embodiment of the present invention includes: a camera module 401 for receiving images captured by at least a pair of cameras (e.g., stereoscopic cameras); a controller 402 for converting the images received by the camera module into a three-dimensional (3D) image; and a communication unit 405 for outputting the 3D image to a 3D TV through a specified interface (e.g., a high definition multimedia interface (HDMI)) and/or outputting the 3D image to a server via a streaming interface (e.g., H.264). Here, the method for converting the images captured by the pair of cameras into a 3D image is a known art, so a detailed description thereof will be omitted.

When the controller transmits 3D contents to a server such as Youtube through the communication unit 405, the controller 402 may encode the 3D contents for streaming to the server, and when the controller 402 transmits the 3D contents to an external device (e.g., a TV, or the like) through the HDMI interface, the controller may decode the 3D contents that have been encoded for streaming and transmit the decoded 3D contents through the HDMI interface. Alternatively, the controller 402 may cause the 3D contents to bypass a function for stream encoding so as to transmit 3D contents that have not been encoded to the external device through the HDMI interface. The 3D contents may include the 3D image. The 3D contents may be previously stored in the storage unit 404.

Alternatively, the controller 402 may transmit the images captured by at least a pair of cameras to the 3D TV via the HDMI interface. These images may be separate left and right images, or may be combined left and right images. The images sent to the 3D TV via the HDMI interface may be images that were formatted for 3D by the mobile terminal (e.g., for display on the mobile terminal) and then unformatted back into left and right images (separate or combined) prior to transmission to the 3D TV, or may be images that have never been formatted for 3D. In either situation, a 3D formatter in the 3D TV may format the images for 3D display.

Similarly, the controller 402 may transmit the images captured by at least a pair of cameras to the server via the streaming interface after being encoded for streaming. These images may be separate left and right images, or may be combined left and right images. The left and right images sent to the server via the streaming interface may be left and right images that were formatted for 3D by the mobile terminal (e.g., for display on the mobile terminal) and then unformatted, or may be left and right images that have never been formatted for 3D. In either situation, a 3D formatter in the server may decode the streamed left and right images (separate or combined) and then format the left and right images for 3D display.

In either embodiment, the controller may determine whether or not the communication unit is connected to the remote device via a connection configured to stream data in a variety of ways. For example, the determination may be made in response to a user selection of one of a 3D television (TV) and a server as the remote device. This may include polling the remote device for device characteristic information or through another set up procedure. Or the determination may be made in the process of connecting to one of the devices.

The communication unit 405 may output the 3D image to the 3D TV through a short-range wireless communication network (e.g., Bluetooth™ communication, infrared communication, or the like). The controller 402 may display the 3D image or a 2D image on the display unit 403. The controller 402 may store the 3D image and/or the 2D image in the storage unit 404 in real time.

The controller 402 may convert the 3D image into an image of any one of a side-by-side format and a frame sequential format. The controller 402 may convert the 3D image into an image of an anaglyph format, and output the 3D image in the anaglyph format to the 3D TV. The anaglyph format may be a red/blue anaglyph format or a gray anaglyph format.

The controller 402 may include a coding unit for encoding the 3D image or the 2D image and outputting the encoded image.

An image processing method of the mobile terminal according to the first exemplary embodiment of the present invention will now be described with reference to FIGS. 3 to 5.

FIGS. 4A and 4B are flow charts illustrating the process of an image processing method of a mobile terminal according to the first exemplary embodiment of the present invention.

First, in FIG. 4A, the camera module 401 receives images simultaneously captured by at least a pair of cameras and outputs the received images to the controller 402 (step S11). For example, the camera module 401 receives images (left and right images) simultaneously captured through a first camera (left camera) and a second camera (right camera) installed side by side in the mobile terminal, and outputs the received images to the controller 402.

The controller 402 converts the images received by the camera module 401 into a 3D image (step S12). For example, the controller 402 converts the left and right images into images of a side-by-side format to generate a 3D image. Also, the controller 402 may convert the left and right images into images of a frame sequential format. In this case, the controller 402 may encode the 3D image through the coding unit and output the encoding results to the communication unit 405.

When the images received by the camera module are converted into the 3D image, the controller 402 may generate a window (e.g., a pop-up window) inquiring whether to transmit the 3D image to the 3D TV and display the generated window on the display unit 403 (step S13). The controller 402 may display one (e.g., the left image, 2D image) of the images (e.g., the left and right images) received by the camera module 401 on the display unit 403 or the 3D image on the display unit 403.

FIG. 4B is identical to FIG. 4A except that steps S111-S151 address the transmission of a combined left and right image, prior to 3D formatting, to the 3D TV.

Figure 5:
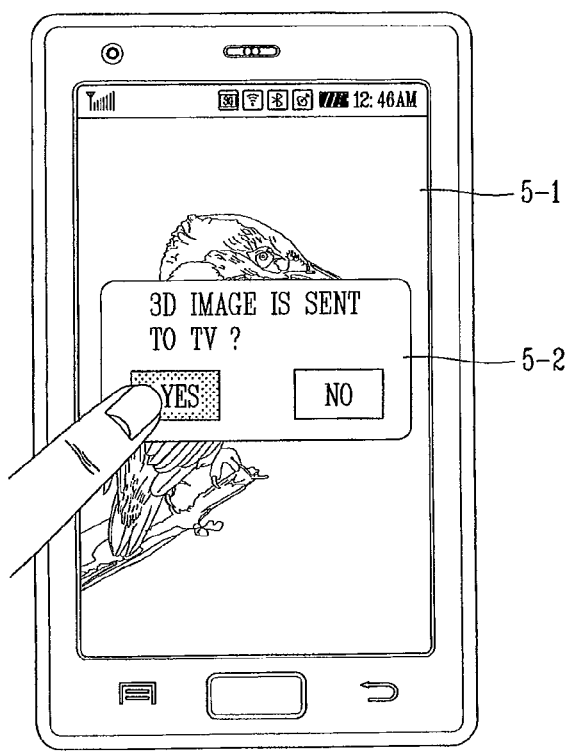
FIG. 5 is an overview of a display screen illustrating a window displayed on a display unit according to the first exemplary embodiment of the present invention.

FIG. 5 is an overview of a display screen illustrating a window displayed on a display unit according to the first exemplary embodiment of the present invention.

As shown in FIG. 5, the controller 402 may generate a window (e.g., a pop-up window) 5-2 inquiring whether to transmit the 3D image 5-1 to the 3D TV and display the generated window 5-2 on the display unit 403. The controller 402 may display one (e.g., the left image, 2D image) of the images (e.g., the left and right images) received by the camera module 401 on the display unit 403 or the 3D image 5-1 on the display unit 403.

When a signal requesting a transmission of the 3D image to the 3D TV is input by the user in response to the displayed window (e.g., the pop-up window) (e.g., when 'Yes' displayed on the window is selected by the user) (step S14), the controller 402 outputs the 3D image to the communication unit 405.

The communication unit 405 transmits the 3D image to the 3D TV 500 shown in FIG. 3 (step S15). For example, the communication unit 405 may output the 3D image to the 3D TV 500 through an HDMI. Also, the communication unit 405 may output the 3D image to the 3D TV 500 through a short-range wireless communication network (e.g., Bluetooth™ communication, infrared communication, or the like). The user may view the 3D image by selecting polarized glasses or active shutter glasses according to the panel type of the 3D TV 500. Also, when the controller 402 transmits the image that has been converted into the image of the common gray anaglyph format, the user may view the 3D image through anaglyph glasses.

Thus, in the image processing apparatus and method of the mobile terminal according to the first exemplary embodiment of the present invention, the 3D image is generated based on the images captured by the pair of cameras and transmitted to the 3D TV 500 according to a user request, whereby the user can view the 3D image through the 3D TV 500.

Hereinafter, an image processing apparatus and method of the mobile terminal according to a second exemplary embodiment of the present invention will now be described with reference to FIGS. 6 to 8. The image processing apparatus and method according to exemplary embodiments of the present invention may be applicable to a video player such as a 3D TV for displaying a 3D and/or 2D image, or to a terminal such as a smartphone, a notebook computer, a personal digital assistant (PDA), a portable multimedia player (PMP), or the like, as well as to a mobile terminal such as the mobile terminal 100, the telematics terminal 200, a navigation device, or the like.

Figure 6:
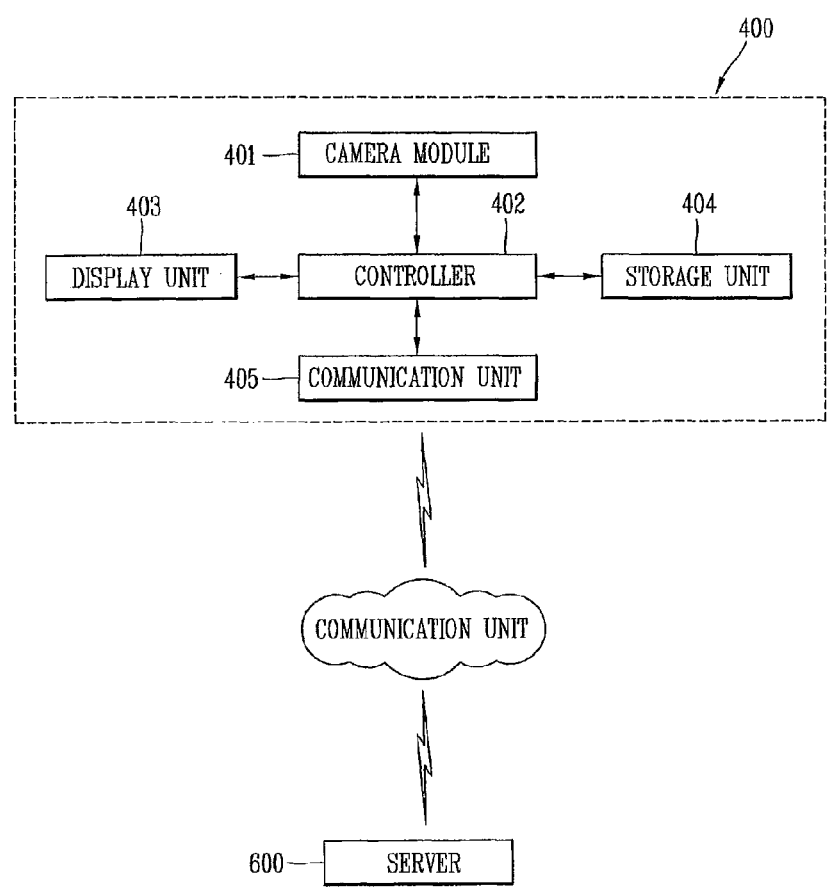
FIG. 6 is a schematic block diagram of the image processing apparatus of a mobile terminal according to a second exemplary embodiment of the present invention.

FIG. 6 is a schematic block diagram of the image processing apparatus of a mobile terminal according to a second exemplary embodiment of the present invention.

As shown in FIG. 6, an image processing apparatus 400 of a mobile terminal according to the second exemplary embodiment of the present invention includes: a camera module 401 for receiving images captured by at least a pair of cameras; a controller 402 for converting the images received by the camera module into a three-dimensional (3D) image; and a communication unit 405 for outputting the 3D image to a server 600 through a wired/wireless communication network (e.g., via a H.264 or other streaming connection). Here, the method for converting the images captured by the pair of cameras into a 3D image is a known art, so a detailed description thereof will be omitted.

The communication unit 405 may output the 3D image to the server 600 through a wired/wireless communication network (e.g., the Internet, a WiFi communication network, a Wibro communication network, a WCDMA (Wideband Code Division Multiple Access) communication network, or the like). The controller 402 may display the 3D image or a 2D image on the display unit 403. The controller 402 may store the 3D image and/or the 2D image in the storage unit 404 in real time.

The controller 402 may convert the 3D image into an image of any one of a side-by-side format and a frame sequential format. The controller 402 may convert the 3D image into an image of an anaglyph format, and output the 3D image in the anaglyph format to the server 600. The anaglyph format may be a red/blue anaglyph format or a gray anaglyph format.

The controller 402 may include a coding unit for encoding the 3D image or the 2D image and outputting the encoded image.

An image processing method of the mobile terminal according to the second exemplary embodiment of the present invention will now be described with reference to FIGS. 6 to 8.

Figure 7A:
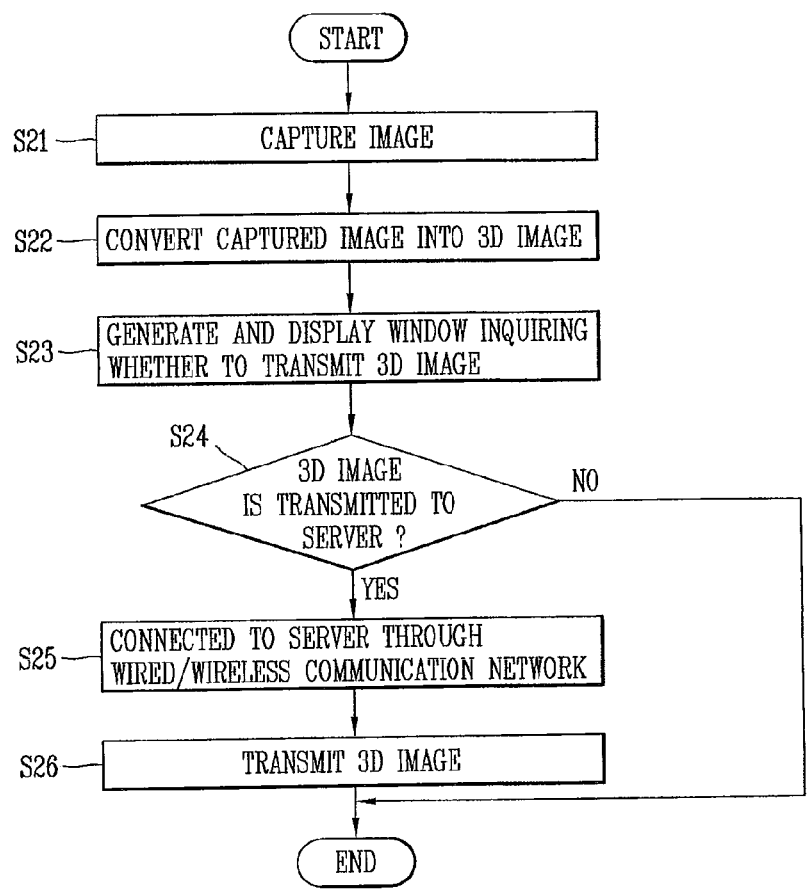
FIGS. 7A and 7B are flow charts illustrating the process of an image processing method of a mobile terminal according to the second exemplary embodiment of the present invention.
Figure 7B:
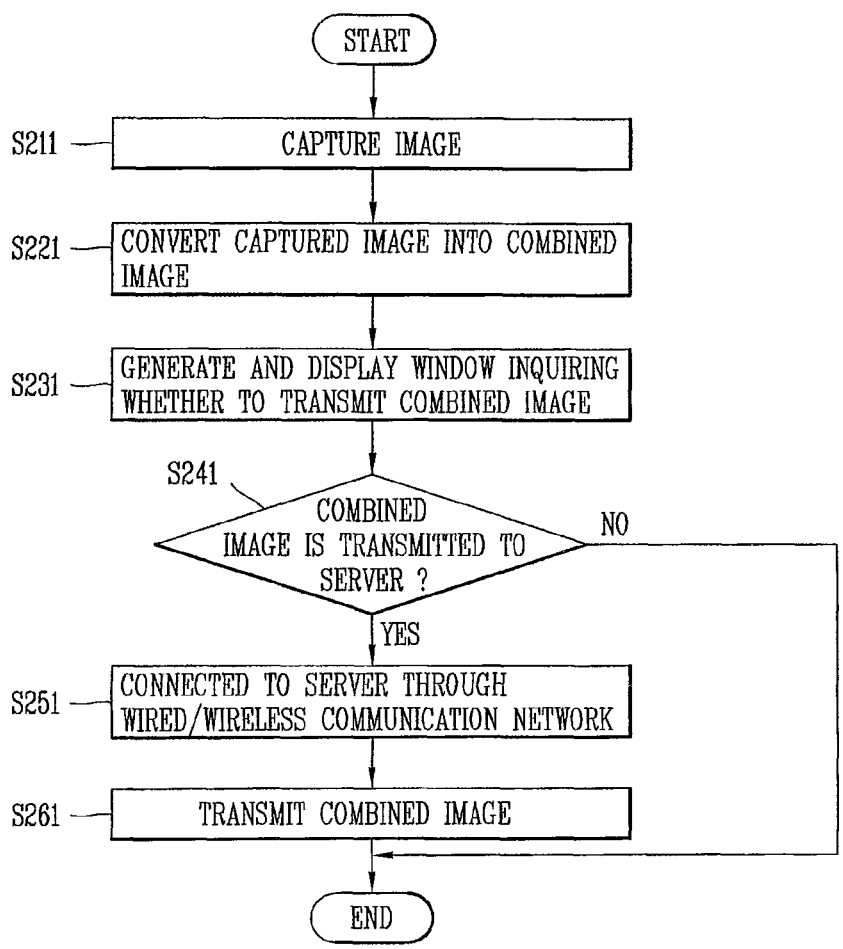

FIGS. 7A and 7B are flow charts illustrating the process of an image processing method of a mobile terminal according to the first exemplary embodiment of the present invention.

First, in FIG. 7A, the camera module 401 receives images simultaneously captured by at least a pair of cameras and outputs the received images to the controller 402 (step S21). For example, the camera module 401 receives images (left and right images) simultaneously captured through a first camera (left camera) and a second camera (right camera) installed side by side in the mobile terminal, and outputs the received images to the controller 402.

The controller 402 converts the images received by the camera module 401 into a 3D image (step S22). For example, the controller 402 converts the left and right images into images of a side-by-side format to generate a 3D image. Also, the controller 402 may convert the left and right images into images of a frame sequential format. In this case, the controller 402 may encode the 3D image through the coding unit and output the encoding results to the communication unit 405.

When the images received by the camera module are converted into the 3D image, the controller 402 may generate a window (e.g., a pop-up window) inquiring whether to transmit the 3D image to the server and display the generated window on the display unit 403 (step S23).

The controller 402 may display one (e.g., the left image, 2D image) of the images (e.g., the left and right images) received by the camera module 401 on the display unit 403 or the 3D image on the display unit 403.

FIG. 7B is identical to FIG. 7A except that steps S211-S261 address the transmission of a combined left and right image, prior to 3D formatting, to the server.

Figure 8:
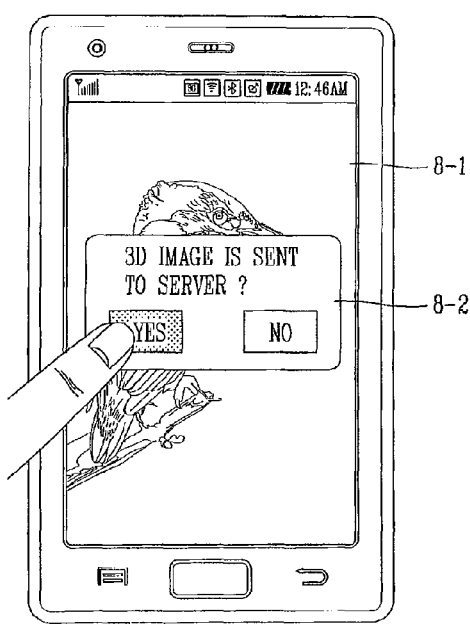
FIG. 8 is an overview of a display screen illustrating a window displayed on a display unit according to the second exemplary embodiment of the present invention.

FIG. 8 is an overview of a display screen illustrating a window displayed on a display unit according to the second exemplary embodiment of the present invention.

As shown in FIG. 8, the controller 402 may generate a window (e.g., a pop-up window) 8-2 inquiring whether to transmit the 3D image 8-1 to the server 600 and display the generated window 8-2 on the display unit 403. The controller 402 may display one (e.g., the left image, 2D image) of the images (e.g., the left and right images) received by the camera module 401 on the display unit 403 or the 3D image 8-1 on the display unit 403.

When a signal requesting a transmission of the 3D image is input by the user to the server 600 in response to the displayed window (e.g., the pop-up window) (e.g., when 'Yes' displayed on the window is selected by the user) (step S24), the controller 402 connects to the server 600 through the communication unit 405 (step S25).

The communication unit 405 transmits the 3D image to the server 600 (step S26). For example, the communication unit 405 may output the 3D image to the server 600 through the Internet, a WiFi communication network, a Wibro communication network, a WCDMA (Wideband Code Division Multiple Access).

The controller 402 may download streaming data corresponding to the 3D image from the server 600 according to a user request, and display the downloaded 3D image on the display unit 403 or on the 3D display device (e.g., the 3D TV). The streaming data may be formatted according to H.264.

Thus, in the image processing apparatus and method of the mobile terminal according to the second exemplary embodiment of the present invention, the 3D image is generated based on the images captured by the pair of cameras and transmitted to the 3D TV according to a user request, whereby many and unspecified persons can access the server to view the 3D image through their 3D display device.

Hereinafter, an image processing apparatus and method of the mobile terminal according to a third exemplary embodiment of the present invention will now be described with reference to FIGS. 9 to 11. The image processing apparatus and method according to exemplary embodiments of the present invention may be applicable to a video player such as a 3D TV for displaying a 3D and/or 2D image, or to a terminal such as a smartphone, a notebook computer, a personal digital assistant (PDA), a portable multimedia player (PMP), or the like, as well as to a mobile terminal such as the mobile terminal 100, the telematics terminal 200, a navigation device, or the like.

Figure 9:
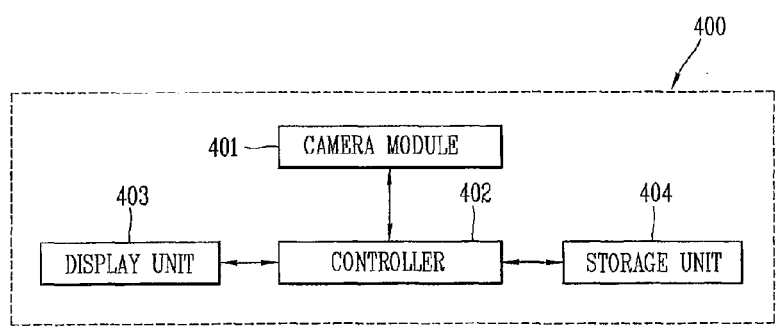
FIG. 9 is a schematic block diagram of the image processing apparatus of a mobile terminal according to a third exemplary embodiment of the present invention.

FIG. 9 is a schematic block diagram of the image processing apparatus of a mobile terminal according to a third exemplary embodiment of the present invention.

As shown in FIG. 9, an image processing apparatus 400 of a mobile terminal according to the third exemplary embodiment of the present invention includes: a camera module 401 for receiving images captured by at least a pair of cameras; a controller 402 for generating a 3D image format setup menu for setting a 3D image format, and converting the images (captured images) received by the camera module 401 into a 3D image format corresponding to selected 3D glasses when an icon indicating a particular 3D glasses displayed on the 3D image format setup menu is selected; and a display unit 405 for displaying the 3D image format setup menu or the 3D image which has been converted into the 3D image format. Here, the method for converting the images captured by the pair of cameras into a 3D image is a known art, so a detailed description thereof will be omitted.

The controller 402 may display the 3D image or a 2D image on the display unit 403. The controller 402 may store the 3D image and/or the 2D image in the storage unit 404 in real time.

The controller 402 displays the 3D image format setup menu including an icon denoting polarized glasses, an icon denoting active shutter glasses, an icon denoting anaglyph glasses, and an icon denoting naked eyes on the display unit 403 according to a user request.

When the icon denoting the polarized glasses or the icon denoting the active shutter glasses is selected by the user, the controller 402 converts the captured images into images of any one of a side-by-side format or a frame sequential format to generate a 3D image, and displays the generated 3D image on the display unit 403.

When the icon denoting anaglyph glasses is selected by the user, the controller may convert the captured images into images of an anaglyph format to generate a 3D image, and display the generated 3D image which has been converted to have the anaglyph format on the display unit. The user may view the 3D image that has been converted into an image of the anaglyph format through the anaglyph glasses. The anaglyph format may be a red/blue anaglyph format or a gray anaglyph format.

When the icon denoting naked eyes is selected by the user, the controller displays the captured images as 2D images on the display unit 403. For example, when the icon denoting naked eyes is selected by the user, the controller may display only an image captured by any one of the left camera and the right camera on the display unit 403.

Hereinafter, the image processing method of the mobile terminal according to the third exemplary embodiment of the present invention will now be described with reference to FIGS. 9 to 11.

Figure 10:
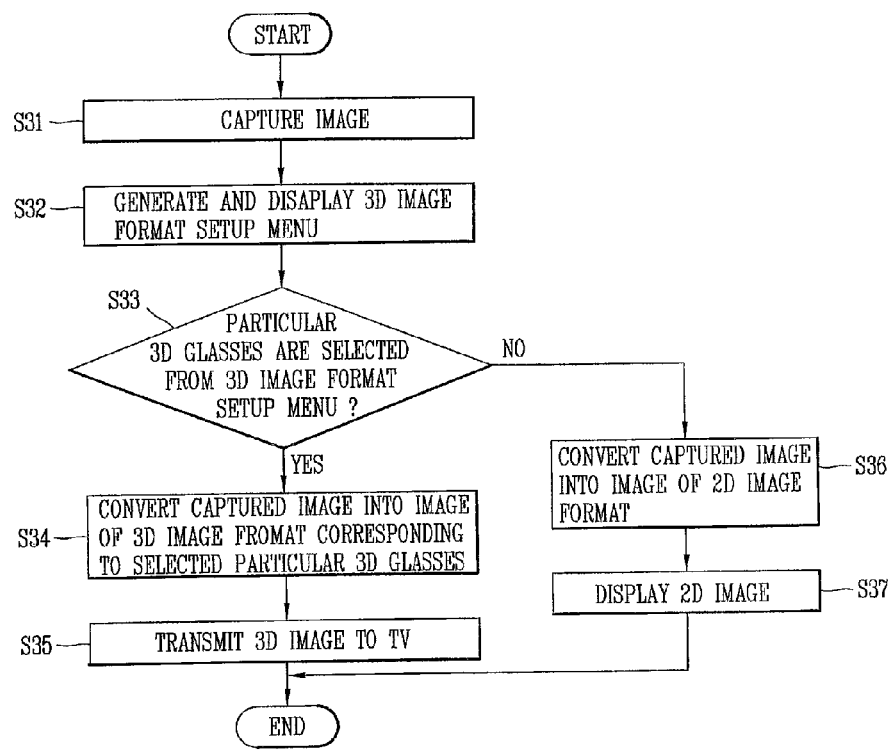
FIG. 10 is a flow chart illustrating the process of an image processing method of a mobile terminal according to the third exemplary embodiment of the present invention.

FIG. 10 is a flow chart illustrating the process of an image processing method of a mobile terminal according to the third exemplary embodiment of the present invention.

First, the camera module 401 receives images simultaneously captured by at least a pair of cameras and outputs the received images to the controller 402 (step S31). For example, the camera module 401 receives images (left and right images) simultaneously captured through a first camera (left camera) and a second camera (right camera) installed side by side in the mobile terminal, and outputs the received images to the controller 402.

The controller 401 generates the 3D image format setup menu for setting a 3D image format according to a user request and displays the generated 3D image format setup menu on the display unit 403 (step S32).

Figure 11:
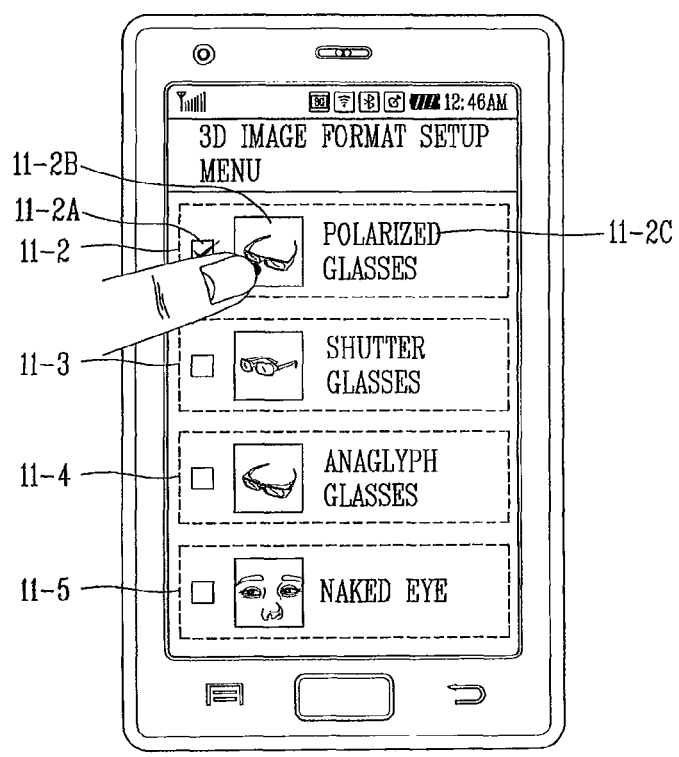
FIG. 11 is an overview of a display screen illustrating a 3D image format setup menu displayed on a display unit according to the third exemplary embodiment of the present invention.

FIG. 11 is an overview of a display screen illustrating a 3D image format setup menu displayed on a display unit according to the third exemplary embodiment of the present invention.

As shown in FIG. 11, the 3D image format setup menu includes a polarized glasses selection item 11-2 including an icon 11-2A denoting whether or not the polarized glasses have been selected, an icon 11-2B denoting the polarized glasses, and character information 11-2C indicating the name of the polarized glasses; an active shutter glasses selection item 11-3 including an icon denoting whether or not active shutter glasses have been selected, an icon denote the active shutter glasses, and character information indicating the name of the active shutter glasses; an anaglyph glasses selection item 11-4 including an icon denoting whether not anaglyph glasses have been selected, an icon denoting the anaglyph glasses, and character information indicating the name of the anaglyph glasses; and a naked eye selection item 11-5 including an icon denoting whether or not naked eyes have been selected, an icon denoting naked eyes, and character information indicating the naked eyes.

The controller 402 determines whether or not particular 3D glasses have been selected in the 3D image format setup menu displayed on the display unit 403 (step S33).

When particular 3D glasses are selected by the user in the 3D image format setup menu displayed on the display unit 403, the controller 402 converts the images (captured images) received by the camera module 401 into a 3D image format corresponding to the selected particular 3D glasses (step S34).

For example, when any one of the polarized glasses selection item 11-2 and the active shutter glasses selection item 11-3 is selected (e.g., when the icon denoting the polarized glasses or the icon denoting the active shutter glasses is selected), the controller 402 converts the captured images into any one of side-by-side format and the frame sequential format to generate a 3D image. Here, when a panel type of the display unit 403 is a panel for displaying a 3D image through the polarized glasses, the controller 402 may automatically select the polarized glasses selection item 11-2, and when the panel type of the display unit 403 is a panel for displaying a 3D image through the active shutter glasses, the controller 402 may automatically select the active shutter glasses selection item 11-3.

When any one in the anaglyph glasses selection item 11-4 is selected (e.g., when the icon denoting the anaglyph glasses is selected), the controller 402 converts the captured images into an anaglyph format to generate a 3D image.

The controller 402 displays the 3D image that has been converted into the 3D image format corresponding to the selected particular 3D glasses on the display unit 403 (step S35).

Meanwhile, when any one in the naked eye selection item 11-5 is selected by the user (e.g., when the icon denoting naked eyes is selected), the controller 402 outputs any one (e.g., the left image) of the captured images (e.g., the left image and the right image) on the display unit 403. For example, when any one in the naked eye selection item 11-5 is selected by the user (e.g., when the icon denoting naked eyes is selected), the controller 402 converts the captured images (e.g., the left image and the right image) into images of a 2D image format (step S36) and displays the converted 2D images on the display unit 403 (step S37).

Thus, in the image processing apparatus and method of the mobile terminal according to the third exemplary embodiment of the present invention, the images captured by the pair of cameras are converted into a 3D image format corresponding to the 3D glasses selected by the user, whereby the user can easily and quickly view the 3D image through the 3D glasses.

As described above, in the image processing apparatus and method of the mobile terminal according to an exemplary embodiment of the present invention, the 3D image is generated based on the images captured by the pair of cameras and transmitted to the 3D TV according to a user request, whereby the user can view the 3D image through the 3D TV.

Also, in the image processing apparatus and method of the mobile terminal according to an exemplary embodiment of the present invention, the 3D image is generated based on the images captured by the pair of cameras and transmitted to the 3D TV according to a user request, whereby many and unspecified persons can access the server to view the 3D image through their 3D display device.

In addition, in the image processing apparatus and method of the mobile terminal according to an exemplary embodiment of the present invention, the images captured by the pair of cameras are converted into a 3D image format corresponding to the 3D glasses selected by the user, whereby the user can easily and quickly view the 3D image through the 3D glasses.

As the present invention may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. An image processing apparatus of a mobile terminal, the apparatus comprising:
   a camera module configured to receive an image or video captured by at least a pair of cameras installed in the mobile terminal;
   a display unit;
   a communication unit configured to exchange information with a three-dimensional (3D) television (TV);
   an encoder;
   a decoder; and
   a controller operatively connected to the camera module, the display unit, the encoder, the decoder and the communication unit, the controller configured to convert the image or video received by the camera module into one of a three-dimensional (3D) image and a 3D video corresponding to a 3D image format of the 3D television;

control the encoder such that the 3D image or 3D video is encoded by the encoder;

determine whether or not the communication unit is connected to the 3D television via a high definition multimedia interface (HDMI) connection or a server via a H.264 connection;

control the decoder such that the encoded 3D image or 3D video is decoded by the decoder if the communication unit is determined to be connected to the 3D television via the HDMI connection;

transmit the decoded 3D image or 3D video to the 3D television if the communication unit is determined to be connected to the 3D television via the HDMI connection; and transmit the encoded 3D image or 3D video to the server, without decoding the encoded 3D image or 3D video, if the communication unit is determined to be connected to the server via the H.264 connection, wherein the controller is configured to generate a 3D image format setup menu for setting the 3D image format of the 3D television, and display the 3D image format setup menu on the display unit, and when an icon denoting a particular type of 3D glasses displayed on the 3D image format setup menu is selected, the controller is configured to convert the image or video received by the camera module into the 3D image format corresponding to the 3D television, wherein the controller is configured to convert the 3D image or 3D video into an image having one of a side-by-side format and a frame sequential format.

2. The apparatus of claim 1, wherein the controller is configured to control the 3D image or 3D video to bypass the encoder.

3. The apparatus of claim 1, wherein the controller is configured to convert the captured image or video into images or video of an anaglyph format, and output the converted image or video in the anaglyph format.

4. The apparatus of claim 1, wherein the controller is configured to generate a window inquiring whether to transmit the 3D image or 3D video when the image or video received by the camera module are converted into the 3D image or 3D video, and display the generated window on the display unit.

5. The apparatus of claim 1, wherein the controller is configured to generate a window inquiring whether to transmit the 3D image or 3D video to the server or to the 3D TV when the images or video captured by the camera module are converted into the 3D image or 3D video, and display the generated window on the display unit.

6. The apparatus of claim 1, wherein, when an icon denoting polarized glasses displayed on the 3D image format setup menu or an icon denoting active shutter glasses is selected, the controller is configured to convert the image or video received by the camera module into the 3D image or 3D video according to one of a side-by-side format and a frame sequential format, respectively.

7. The apparatus of claim 6, wherein, when an icon denoting anaglyph glasses displayed on the 3D image format setup menu is selected, the controller is configured to convert the image or video received by the camera module into the 3D image or 3D video according to an anaglyph format.

8. The apparatus of claim 7, wherein the anaglyph format is a red/blue anaglyph format or a gray anaglyph format.

9. The apparatus of claim 7, wherein, when an icon denoting naked eyes displayed on the 3D image format setup menu is selected, the controller is configured to convert the image or video received by the camera module into an image or video having a 2D image format, and display the 2D image or video on the display unit.

10. The apparatus of claim 1, wherein the 3D image format setup menu comprises:
   a polarized glasses selection item including an icon denoting whether or not the polarized glasses have been selected, an icon denoting the polarized glasses, and character information indicating the name of the polarized glasses;
   an active shutter glasses selection item including an icon denoting whether or not active shutter glasses have been selected, an icon denoting the active shutter glasses, and character information indicating the name of the active shutter glasses;
   an anaglyph glasses selection item including an icon denoting whether or not anaglyph glasses have been selected, an icon denoting the anaglyph glasses, and character information indicating the name of the anaglyph glasses; and
   a naked eye selection item including an icon denoting whether or not naked eyes have been selected, an icon denoting the naked eyes, and character information indicating the naked eyes.

11. The apparatus of claim 1, wherein the controller is configured to determine whether or not the communication unit is connected to the 3D television or the server a user selection of one of the 3D television (TV) and the server.

12. An image processing method for a mobile terminal including a camera module having at least a pair of cameras, a display unit, an encoder, a communication unit and a controller, the method comprising:
   receiving, by the controller, an image or video captured by the at least a pair of cameras installed in the mobile terminal;
   generating, by the controller, a three-dimensional (3D) image format setup menu for setting a 3D image format of a 3D television;
   displaying the generated 3D image format setup menu on the display unit;
   converting, by the controller, the received image or video into one of a three-dimensional (3D) image and a 3D video corresponding to a 3D image format of a 3D television, when an icon denoting a particular type of 3D glasses displayed on the 3D image format setup menu is selected;
   encoding, by the encoder, the converted 3D image or 3D video;
   determining, by the controller, whether or not the communication unit is connected to the 3D television via a high definition multimedia interface (HDMI) connection or a server via a H.264 connection;
   decoding, by the decoder, the encoded 3D image or 3D video if the communication unit is determined to be connected to the 3D television via the HDMI connection;
   transmitting, by the controller, the decoded 3D image or 3D video to the 3D television if the communication unit is determined to be connected to the 3D television via the HDMI connection; and
   transmitting, by the controller, the encoded 3D image or 3D video to the server, without decoding the encoded 3D image or 3D video, if the communication unit is determined to be connected to the server via the H.264 connection,
wherein the step of converting comprises converting the 3D image or 3D video into an image having one of a side-by-side format and a frame sequential format.

13. The method of claim 12, wherein the step of transmitting the 3D image or 3D video to the remote device comprises:
controlling the 3D image or 3D video to bypass the encoder.

14. The method of claim 12, wherein the step of converting comprises:
convert the captured image or video into images or video of an anaglyph format, and outputting the converted image or video in the anaglyph format.

15. The method of claim 12, further comprising:
generating, by the controller, a window inquiring whether to transmit the 3D image or 3D video when the image or video are converted into the 3D image or 3D video, and displaying the generated window on the display unit.

16. The method of claim 12, further comprising:
generating, by the controller, a window inquiring whether to transmit the 3D image or 3D video to the server or to the 3D TV when the images or video captured by the camera module are converted into the 3D image or 3D video, and displaying the generated window on the display unit.

17. The method of claim 12, wherein, when an icon denoting polarized glasses displayed on the 3D image format setup menu or an icon denoting active shutter glasses is selected, the step of converting comprises:
converting the image or video into the 3D image or 3D video according to one of a side-by-side format and a frame sequential format, respectively.

18. The method of claim 17, wherein, when an icon denoting anaglyph glasses displayed on the 3D image format setup menu is selected, the step of converting comprises:
converting the image or video received by the camera module into the 3D image or 3D video according to an anaglyph format.

19. The method of claim 18, wherein the anaglyph format is a red/blue anaglyph format or a gray anaglyph format.

20. The method of claim 19, wherein, when an icon denoting naked eyes displayed on the 3D image format setup menu is selected, the step of converting comprises:
converting the image or video received by the camera module into an image or video having a 2D image format, and displaying the 2D image or video on the display unit.

21. The method of claim 12, wherein the 3D image format setup menu comprises: a polarized glasses selection item including an icon denoting whether or not the polarized glasses have been selected, an icon denoting the polarized glasses, and character information indicating the name of the polarized glasses;
an active shutter glasses selection item including an icon denoting whether or not active shutter glasses have been selected, an icon denoting the active shutter glasses, and character information indicating the name of the active shutter glasses;
an anaglyph glasses selection item including an icon denoting whether or not anaglyph glasses have been selected, an icon denoting the anaglyph glasses, and character information indicating the name of the anaglyph glasses; and
a naked eye selection item including an icon denoting whether or not naked eyes have been selected, an icon denoting the naked eyes, and character information indicating the naked eyes.

22. The method of claim 12, wherein the step of determining comprises:
determining whether or not the communication unit is connected to the 3D television or the server based on a user selection of one of the 3D television (TV) and the server.

* * * * *